US006251808B1

(12) United States Patent

Rose et al.

(10) Patent No.: US 6,251,808 B1

(45) Date of Patent: Jun. 26, 2001

(54) METAL AND FIBERGLASS CLEANING AND POLISHING ARTICLE

(75) Inventors: Edward S. Rose, Leawood, KS (US); Raymond G. Wile, Liberty, MO (US)

(73) Assignee: Illinois Tool Works, Inc., Glenview, IL (US)

(*) Notice: Subject to any disclaimer, the term of this patent is extended or adjusted under 35 U.S.C. 154(b) by 0 days.

(21) Appl. No.: 08/956,215

(22) Filed: Oct. 22, 1997

(51) Int. Cl.[7] ........................ B32B 3/00

(52) U.S. Cl. ........................ 442/148; 15/209.1; 442/59; 442/153; 510/268; 510/271; 510/295

(58) Field of Search ........................ 442/59, 60, 72, 442/101, 148, 153; 15/209.1; 510/268, 271, 295

(56) References Cited

U.S. PATENT DOCUMENTS

| | | |
|---|---|---|
| Re. 31,885 | 5/1985 | Meitner . |
| 3,277,013 | 10/1966 | Gianladis . |
| 3,540,891 | 11/1970 | Muhler . |
| 3,619,251 | 11/1971 | Stiles, Sr. . |
| 4,133,921 | 1/1979 | Palcher . |
| 4,212,759 | 7/1980 | Young et al. . |
| 4,336,151 | 6/1982 | Like et al. . |
| 4,364,746 | 12/1982 | Bitzer et al. . |
| 4,448,704 | 5/1984 | Barby et al. . |
| 4,665,580 | 5/1987 | Morris . |
| 4,666,621 | 5/1987 | Clark et al. . |
| 4,753,844 | 6/1988 | Jones et al. . |
| 4,775,582 | 10/1988 | Abba et al. . |
| 4,784,786 | 11/1988 | Smith et al. . |
| 4,808,328 | 2/1989 | Flohr . |
| 4,833,003 | 5/1989 | Win et al. . |
| 4,853,281 | 8/1989 | Win et al. . |
| 4,927,556 | 5/1990 | Pokorny . |
| 4,931,201 | 6/1990 | Julemont . |
| 4,974,763 | 12/1990 | Widrig . |
| 5,094,770 | 3/1992 | Sheridan et al. . |
| 5,141,803 | 8/1992 | Pregozen . |
| 5,230,730 | 7/1993 | Speckmann et al. . |
| 5,234,719 | 8/1993 | Richter et al. . |
| 5,683,971 | 11/1997 | Rose et al. . |

FOREIGN PATENT DOCUMENTS

| | | |
|---|---|---|
| 4025039 | 2/1992 | (DE) . |
| 4323908 | 1/1995 | (DE) . |
| 0068722 | 5/1983 | (EP) . |
| 0256950 | 2/1988 | (EP) . |
| 0392316 | 10/1990 | (EP) . |
| 0573277 | 8/1993 | (EP) . |
| 0842866 | 7/1960 | (GB) . |
| 2179052 | 2/1987 | (GB) . |
| WO 9812958 | 4/1998 | (WO) . |

OTHER PUBLICATIONS

Atlas, Formulary of Typical Pharmaceutical Formulations for Topical Application Illustrating the Use of ATLAS Surfactants and Sorbitol. p. 39–43.

Coleman, D–Limonene As A Degreasing Agent. The Citrus Industry, Nov., 1975. vol. 56, p. 23–25.

Procter & Gamble, Jergens Liquid Soap, Aug. 22, 1986. p. 1.

Lazurosak, Waterless Hand Cleaners and Barrier Creams, Detergents and Specialties, Apr., 1969. p. 26, 28, 73.

Geoghegan, et al., Waterless Hand Cleaners, Soap & Chemical Specialities, Aug., 1969. p. 54–56, 82.

*Primary Examiner*—James J. Bell

(74) *Attorney, Agent, or Firm*—Shook, Hardy & Bacon L.L.P.

(57) ABSTRACT

An abrasive metal and fiberglass cleaner and polish article comprises a substrate presenting an abrasive surface and being capable of absorbing and retaining a fluid, and a metal and fiberglass cleanser absorbed in the substrate, the cleanser being an oil-in-water emulsion comprising a solvent, a surfactant, an oxidation removing agent, an emulsifier, and a carrier, whereby cleansing action is achieved by the emulsion, and abrasive cleansing action is achieved by the abrasive surface of the substrate. The substrate can comprise a cloth-like towel. A plurality of such towels are packaged into a re-sealable, flexible, vinyl pouch, removed one at a time, as necessary, to accomplish the complete cleaning task.

13 Claims, No Drawings

METAL AND FIBERGLASS CLEANING AND POLISHING ARTICLE

BACKGROUND OF THE INVENTION

This invention relates in general to cleaning compositions, and, more particularly, to metal and fiberglass cleaners and polish.

Metal cleaning and polish formulations typically contain a solvent to remove surface organic contaminants, surfactants to emulsify the solvent into a water vehicle, other surfactants to help rinse residues from a cleaned surface, acids to dioxide contaminants, and abrasives to help the acids deoxidize contaminants and to help polish the cleaned metal surface. However, these products generally contain sharp, jagged, abrasive particles of about 15 microns in size. Although these abrasives will polish metal surfaces, scratching generally occurs with the softer metals such as brass. In addition, current systems utilize sizable quantities of ammonia as a penetrating agent, and this can cause discomfort to the user. Other metal cleaners may solely comprise acids which are used to clean oxidation contaminants. These may be too aggressive in that permanent metal damage can occur, and the residues of such cleaners could result in environmental disposal concerns.

After cleaning contaminated surfaces such as brass, a blackish colored residue must be physically removed with a cloth, or may sometimes be rinsed with clean water and a cloth. This process often results in re-application of these residues from rags back onto the metal surface, with undesirable cleaning results. Similar problems result from cleaning other metal surfaces, including copper, gold, silver, stainless steel, chrome, aluminum, anodized aluminum, magnesium, pewter, nickel, bronze and factory gun bluing.

Some typical metal cleaners and polishes have gelatinous or paste-like high viscosity, requiring a separate rag or applicator to apply. Application is difficult due to this high viscosity, which is necessary so that finely divided polish powders can be held in even suspension throughout the body of the cleaner. If the cleaner is allowed to dry on the metal surface, removal of oxidation contaminants becomes very difficult using conventional dry polishing cloths. In most cases, the metal has to be re-wetted and cleaned once again with the paste-like cleaner so contaminants may be thoroughly removed. Another disadvantage with using this type of cleaner on surfaces having an excess of oxidation contaminants is that the powder polish portion of the formulation needs the assistance of additional abrasion such as metal brushes to completely clean the metal. An additional disadvantage is that if a plentiful supply of clean polishing cloths are not readily available, then the user has a tendency to reapply contaminants back onto the metal surface. Still other products are currently available that exhibit a non-gelatinous consistency. They are generally used by pouring the cleaner into a bowl and then dipping a cloth into the polish to distribute it on the surface to be cleaned. This process is very messy and time consuming, and produces a large amount of waste.

Similarly, prior attempts to clean fiberglass have included compositions incorporating solvent, harsh acids, detergent, and mechanical abrasion. Problems associated with such prior conventional cleaning processes include softening, scratching, and discoloration of these types of fiberglass surfaces.

There is, therefore, a need to provide a metal and fiberglass cleaning and polish article having non-scratching abrasive characteristics that will provide a low viscosity, easily applied cleaner which does not require numerous applicator and polishing towels. There is also a need to provide such a cleaning and polishing article which does not require the cleaner or oxidation contaminants to be rinsed or removed using additional towels.

SUMMARY OF INVENTION

It is therefore, an object of this invention to provide a metal and fiberglass cleaner and polish article that is comprised of a low viscosity liquid that is saturated onto an abrasive, non-woven towel, so that a uniform, controlled amount of cleaner can be utilized for ease of application, and to prevent an excessive amount of liquid from damaging part of the metal surface.

It is a further object of the present invention to provide a metal and fiberglass cleaner and polish article which utilizes a non-scratching abrasive surface (or surfaces) on the towel to aid the polish powders in the formulation to achieve better cleaning of oxidation contaminants, and to prevent scratching of softer metals such as brass. This non-scratching abrasive surface also eliminates the necessity of using brushes or other mechanical devices.

It is yet another object of the present invention to provide a metal and fiberglass cleaner and polish article which utilizes a non-woven towel that has excellent absorption properties so that oxidation contaminants may be absorbed into the towel during the cleaning process, thereby greatly reducing the effort required in using dry polish cloths.

It is a still further object of the present invention to provide a metal and fiberglass cleaner and polish article which incorporates a liquid cleaner and polish formulation absorbed into a towel so that no additional cloths or other devices are needed to completely accomplish the task of cleaning or polishing the metal and fiberglass surfaces.

It is yet another object of the present invention to provide a metal and fiberglass cleaner and polish article which removes oxidation and other contaminants from a surface, and also provides polishing action on that surface, without the need to use an additional towel or other tool for polishing.

To accomplish these and other related objects of the invention, a metal and fiberglass cleaner and polish article is provided comprising a substrate, such as a cloth-like towel similar to that described in U.S. Pat. No. 4,833,003 to Kimberly-Clark, presenting at least one abrasive surface, the substrate presenting a matrix capable of absorbing and retaining a metal and fiberglass cleaning fluid, wherein the cleaning fluid in an oil-in-water emulsion comprising a solvent, a surfactant, an emulsifier, oxidation removing agents, and a carrier. The article is packaged into a re-sealable vinyl, flexible pouch. The towels are removed, generally one at a time, and used as necessary to accomplish the complete cleaning task.

DESCRIPTION OF THE PREFERRED EMBODIMENT(S)

A metal and fiberglass cleaner and polish article is provided comprising an abrasive substrate having a metal and fiberglass cleanser incorporated therein. The abrasive substrate of the preferred embodiment comprises a cloth-like towel having at least one abrasive surface. The abrasive surface can be formed in several different manners from a number of different materials. According to one embodiment of this invention, the towel can be similar to that described in U.S. Pat. No. 4,833,003 to Kimberly-Clark entitled "Uniformly Moist Abrasive Wipes," issued May 23, 1989, which is herein incorporated by reference in its entirety. The towel encompassed within the scope of this invention has two opposed surfaces, with an abrasive component being permanently attached to or an integral part of at least one surface thereof, although it is possible for the abrasive component to be present on both surfaces of the towel.

The term "abrasive" as used herein refers to an abrasive ingredient or component which, as discussed above, comprises a surface texture that enables the towel to produce a mild scrubbing, scouring or abrading action to effectively remove oxidation and other similar contaminants from a surface, while not harming that surface by scratching or the like. The degree of abrasiveness can vary widely, depending primarily upon the abrasive component on the substrate and the degree of texture which is formed by such abrasive component. Typically, the abrasive surface is somewhat coarse and roughened as compared to a smooth surface of the towel. In accordance with a preferred embodiment of this invention, the preferred abrasive towel is adequately mildly abrasive so as to avoid scratching or otherwise harming the metal or fiberglass surface intended to be cleaned and polished by the towel, while having sufficient abrading qualities to effectively remove embedded soils, oxidized contaminants, soap deposits, grease and other contaminants from the cleaned surface. Although the abrasive properties are very mild in the sense of not cutting or scratching the surface being cleaned and polished, the texture is relatively high so as to remove dried or embedded contaminants from the object being cleaned and polished.

This abrasive component may comprise a layer of fibers and/or globules bonded to the surface of a substrate, such as a layer of fibers or fiber bundles and minute, generally spherical masses having a wide range of acceptable diameters, namely from about 40 microns to about 200 microns. Due to the irregular nature of such fibers and globules it is recognized that the diameter is approximate, as such fibers and globules typically are not perfectly round. These fibers and globules can be formed from polymeric materials by known means, such as by melt blowing, bonding, spinning and the like. It is not necessary to incorporate a combination of fibers and globules, as it is possible to utilize either component by itself as the abrasive. Alternately, the abrasive component may comprise any number of known particulates which can function as an abrasive when bonded onto a substrate.

In one embodiment, one side of the towel is provided with a smooth, non-abrasive surface which can be useful for polishing and wiping. Such a surface has minimal texture and minimal frictional resistance relative to the abrasive side of the towel.

To be optimally effective, the abrasive component of this invention can account for a minimum of 10% and a maximum of 90% of the surface area of the abrasive side of the towel, with the remaining side having a smooth, non-abrasive surface for wiping and polishing. It is anticipated that both sides of the towel can have abrasive components incorporated thereon, and that the percentage of abrasive component on each side can differ as desired for a particular application.

In addition, the towel must be capable of absorbing and retaining a predetermined amount of fluid, such as the liquid cleaning formulation which is associated herewith, sufficient to provide a uniformly moist towel. The absorbent character of the towel encompassed herein is achieved by a system of voids or pores which absorb and tightly retain the liquid formulation, such as by capillary action. The towel should also be capable of readily releasing the liquid during use. The specific void or pore volume of the structure of the towel regulates the amount of fluid which can be retained in the towel. In one embodiment, the towel is composed of a non-woven material which has an affinity to absorb the fluid and is able to absorb or otherwise retain oxidation and other contaminants which have been removed from the cleaned surface.

The non-woven material contemplated for use with this invention can be any of a number of substrates. These fibers can be natural or manufactured, both regenerated and synthetic, as long as they incorporate the characteristics listed above. These fibers can include polypropylene, polyester nylon, rayon, cotton, wood pulp, cellulose, polyethylene, polyvinyl, viscose, polyurethane, and blends thereof.

The liquid metal and fiberglass cleanser which is incorporated onto the towel is an oil-in-water emulsion formulation capable of removing oxidation contaminants, soap deposits, grease, embedded soils and other contaminants from metal and fiberglass surfaces. This emulsion formulation has a viscosity sufficient for being easily absorbed into the pores or voids of the towel through capillary action. The emulsion of the present invention comprises a solvent, a surfactant, am emulsifier, oxidation removing agents and a carrier. Such an emulsion formulation is as follows:

EXAMPLE 1

| Ingredients | Preferred Range (by wt. %) |
|---|---|
| Solvent | 5.0–40.0 |
| Surfactant | 1.0–15.0 |
| Emulsifier | 0.5–10.0. |
| Oxidation removing agent | 1.1–24.0 |
| Deoxized Water | 15.0–70.0 |

In a preferred embodiment, the emulsion comprises odorless mineral spirits as the solvent, anionic tall oil/fatty acid as the surfactant, an oleomide diethanolanime thickener as an emulsifier, and water as the carrier. The solvent is preferably one capable of solubilizing greasy, oily soils, and for example can include aliphatic solvents, dibasic esters, petroleum oils, vegetable oils, terpenes, alcohols, glycols, glycol ethers, furfuryls, petroleum distillates and polyols. The surfactant system preferably contains an anionic surfactant suitable for emulsification. The oxidation removing agents can include a variety of ingredients which remove oxidation and penetrate through oxidation contaminants. Other ingredients can optionally also include anti-bacterial preservatives and abrasive particulates.

An example of a preferred formulation embodied by this invention is as follows, with the acceptable ranges of ingredients being indicated:

EXAMPLE 2

| Ingredients | Acceptable Range of % |
|---|---|
| Odorless Mineral Spirits | 5.0–40.0 |
| Acintol FA-3 | 1.0–15.0 |
| Mackamide O | 0.5–10.0 |

-continued

| Ingredients | Acceptable Range of % |
|---|---|
| Sulfamic Acid | 0.5–10.0 |
| Aqua Ammonia | 0.5–10.0 |
| Tetrapotassium Pyrophosphate | 0.1–4.0 |
| Deoxized Water | 15.0–70.0 |

The mineral spirits listed function as a solvent, which pre-cleans the metal or fiberglass surfaces to remove grease, soap deposits, oil or similar contaminants therefrom. Such a solvent useful in accordance with this invention is one which is capable of solubilizing greasy, oily soils. Some of the preferred solvents which can be substituted for the mineral spirits include other aliphatic solvents, aromatic solvents, acetones, ketones, terpenes, glycol ethers, dibasic esters, glycols, furfuyls, polyols, vegetable oils, alcohols, and other petroleum distillates.

The surfactant can be Unitol LFA, a tall oil fatty acid, which acts as an emulsifier to achieve an oil-in-water emulsion with the mineral spirits. Other acceptable emulsifiers include oleic acid. Similar emulsions may also be prepared using non-ionic systems, however anionic systems are preferred in this formulation.

A thickener is included in the emulsion, which also acts as a stabilizer to help achieve a stable water-and-oil emulsion. In the above formulation, the thickener and stabilizer is Mackamide O, which is an olemide diethanolamine. Equally useful in accordance with the teachings of this invention are cocoamide diethanolamines and sorbitan monoleate. Other suitable thickeners may include natural gums or cellulose.

Water is provided as a carrier.

Sulfamic acid is included in the preferred emulsion formulation of this invention to help remove oxidation from the metal. In addition to the sulfamic acid, other useful ingredients for performing this function include oxalic, citric and acidic acids. Ammonia is a penetrating agent to accelerate through oxidized metals for faster cleaning. Tetrapotassium pyrophosphate is used for faster and more complete removal of cleaned oxides from metal surfaces.

A more specific example of an emulsion formulation in accordance with a preferred embodiment of the present invention is as follows:

EXAMPLE 3

| Ingredients | Preferred % By Weight |
|---|---|
| Odorless Mineral Spirits | 30.000 |
| Acintol FA-3 | 8.000 |
| Mackamide O | 2.000 |
| Sulfamic Acid | 1.000 |
| Aqua Ammonia | 2.2500 |
| Formaldehyde 37% | 0.1500 |
| Tetrapotassium Pyrophosphate | 0.2000 |
| Alumina Oxide | 25.000 |
| Deoxized Water | 31.400 |

In the above example, formaldehyde is optionally incorporated in the formulation as an anti-bacterial preservative. Also included in the above example is alumina oxide, a finely divided abrasive which can further enhance the abrasive component incorporated on one or both sides of the towel as previously described. This abrasive ingredient in the emulsion formulation of the present invention is optional, although it may be desirable to include in the formulation for removing excessive amounts of extreme oxidation found on some metal surfaces.

Additional examples of emulsion formulations in accordance with the present invention include the following:

EXAMPLE 4

| Ingredients | Preferred % By Weight |
|---|---|
| Odorless Mineral Spirits | 38.000 |
| Acintol FA-3 | 13.000 |
| Mackamide O | 8.000 |
| Sulfamic Acid | 1.000 |
| Aqua Ammonia | 2.000 |
| Tetrapotassium Pyrophosphate | 1.000 |
| Deoxized Water | 37.850 |

EXAMPLE 5

| Ingredients | Preferred % By Weight |
|---|---|
| Odorless Mineral Spirits | 32.000 |
| Acintol FA-3 | 10.000 |
| Mackamide O | 6.000 |
| Sulfamic Acid | 8.000 |
| Aqua Ammonia | 2.2500 |
| Tetrapotassium Pyrophosphate | 0.2000 |
| Deoxized Water | 41.550 |

EXAMPLE 6

| Ingredients | Preferred % By Weight |
|---|---|
| Odorless Mineral Spirits | 25.000 |
| Acintol FA-3 | 7.000 |
| Mackamide O | 1.500 |
| Sulfamic Acid | 6.500 |
| Aqua Ammonia | 8.00 |
| Tetrapotassium Pyrophosphate | 3.000 |
| Deoxized Water | 49.000 |

EXAMPLE 7

| Ingredients | Preferred % By Weight |
|---|---|
| Odorless Mineral Spirits | 20.000 |
| Acintol FA-3 | 5.000 |
| Mackamide O | 1.000 |
| Sulfamic Acid | 4.500 |
| Aqua Ammonia | 6.000 |
| Formaldehyde 37% | 0.1500 |
| Tetrapotassium Pyrophosphate | 3.000 |
| Alumina Oxide | 25.000 |
| Deoxized Water | 64.650 |

EXAMPLE 8

| Ingredients | Preferred % By Weight |
|---|---|
| Odorless Mineral Spirits | 15.000 |
| Acintol FA-3 | 3.000 |
| Mackamide O | 0.500 |
| Sulfamic Acid | 0.500 |
| Aqua Ammonia | .7500 |
| Formaldehyde 37% | 0.1500 |
| Tetrapotassium Pyrophosphate | 0.1000 |
| Alumina Oxide | 17.000 |
| Deoxized Water | 63.000 |

EXAMPLE 9

| Ingredients | Preferred % By Weight |
|---|---|
| Odorless Mineral Spirits | 25.000 |
| Acintol FA-3 | 6.000 |
| Mackamide O | 1.500 |
| Sulfamic Acid | 8.000 |
| Aqua Ammonia | 9.000 |
| Formaldehyde 37% | 0.1500 |
| Tetrapotassium Pyrophosphate | 3.5000 |
| Alumina Oxide | 30.000 |
| Deoxized Water | 16.850 |

In preparing the metal and fiberglass cleaning and polishing article of a preferred embodiment, a plurality of abrasive towels are provided in a container as a stack of individual towels. The metal cleaner and polish formulation is then added to the container, preferably by pouring the same over the stack of towels, thereby saturating the towels with the formulation within the container. The capillary action associated with the void volume of the towel as discussed above causes the metal cleaner and polish formulation to be distributed evenly throughout the stack of towels.

An example of a suitable container for holding the towels comprises a resealable, flexible vinyl pouch which can be selectively sealed, and can provide an opening through which the towels can be removed from the container. This opening allows for the passage of towels from the interior of the container via the opening, whereby individual towels can be removed singly by pulling the towel through the opening.

In use, an individual towel is removed from the container as described above. When properly prepared, the towel contains an amount of the liquid cleaner and polish formulation sufficient to thoroughly remove oxidants or other contaminants from surfaces. As the towel is rubbed on the surface, it releases the liquid cleaner and polish formulation and allows it to have extended contact time with the contaminants. It also provides for continuous removal action without the need to apply additional removal liquid. The abrasive character of the towel facilitates removal of embedded soils without leaving any abrasive residue on the cleaned surface, which residue would otherwise necessitate rinsing the surface with water after the cleansing process to thoroughly remove the abrasive residue. Further, the nature of the article facilitates removal of the dissolved oxidation and other contaminant residue, and leaves a clean and polished surface, without the need for rinsing or additional towels or other tools. It is understood, however, that surfaces which contain an excessive amount of oxidation may require rinsing or wiping with a clean towel.

In one embodiment of the present invention, the article presents one abrasive surface and one non-abrasive, smooth surface. The abrasive surface assists in the removal of oxidation and other contaminants as set forth above. The non-abrasive surface is useful for wiping and polishing a surface once the oxidation and other contaminants have been loosened or removed.

In one embodiment, the towel is comprised of a non-woven polypropylene that absorbs the softened oxidation and other contaminant residue to achieve a clean surface. Thus, an article for removing oxidation, soap deposits, grease and other contaminants is provided without the negative features associated with metal polishes in the prior art.

The metal and fiberglass polish and cleaner article of the present invention also assures efficient use of the formulation, since the proper amount of liquid cleaner is provided for each individual use. Further, the removed contaminants are absorbed into the towel, preventing their reapplication onto the surface to be cleaned, obviating the need for using additional cleaning tools such as cloths or polishing brushes.

This product is useful for cleaning and polishing metals and fiberglass. Examples of metal surfaces where this product is useful include, but are not limited to, brass, copper, gold, silver, stainless steel, chrome, aluminum, anodized aluminum, magnesium, pewter, nickel, bronze and factory gun bluing.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. An abrasive metal and fiberglass cleaning and polishing article comprising:

a substrate presenting two opposed surfaces, and having an abrasive ingredient permanently forming a part of at least one said surface, said substrate presenting a matrix capable of absorbing and retaining other components therein; and an emulsion absorbed in the substrate and retained by said matrix, said emulsion comprising:

5–40% by weight of an emulsifiable organic solvent capable of solubilizing greasy, oily soils and comprising one or more of an aliphatic liquid, a dibasic ester, vegetable oil, terpene, a glycol ether, a petroleum oil, an alcohol, a glycol, a furfuryl, a petroleum distillate, and a polyol;

1–15% by weight of a surfactant characterized by the ability to form a water and oil emulsion with said solvent;

1.1–24% by weight of an oxidation removing agent;

0.5–10% by weight of an emulsifier; and

15–70% by weight of water;

whereby said substrate maintains its abrasive quality in the presence of said emulsion and an abrasive cleansing and polishing action is achieved by the combination of said emulsion and the abrasive ingredient on the surface of said substrate.

2. An abrasive metal and fiberglass cleaning article as set forth in claim 1, wherein said substrate comprises a towel.

3. An abrasive metal and fiberglass cleaning article as set forth in claim 2, wherein said towel presents one abrasive surface and one non-abrasive surface.

4. An abrasive metal and fiberglass cleaning article as set forth in claim 1, wherein said solvent comprises mineral spirits.

5. An abrasive hand cleansing article as set forth in claim 4, wherein said surfactant comprises an anionic surfactant.

6. An abrasive hand cleaning article as set forth in claim 1, wherein said emulsion further comprises 0.005–1.0% by weight anti-bacterial preservative agent.

7. An abrasive hand cleaning article as set forth in claim 1, wherein said emulsion further comprises 5–40% by weight of an abrasive particulate.

8. An abrasive metal and fiberglass cleaning article comprising:

a substrate comprising a towel presenting two opposed surfaces, and having an abrasive ingredient permanently forming a part of at least one said surface, said substrate presenting a matrix capable of absorbing and retaining other components therein;

an emulsion absorbed in the towel, said emulsion comprising:

5–40% by weight of an emulsifiable organic solvent capable of solubilizing greasy, oily soils and comprising one or more of an aliphatic liquid, a dibasic ester, vegetable oil, terpene, a glycol ether, a petroleum oil, an alcohol, a glycol, a furfuryl, a petroleum distillate, and a polyol;

1–15% by weight of a surfactant characterized by the ability to form a water and oil emulsion with said solvent;

1.1–24% by weight of an oxidation removing agent;

0.5–10% by weight of an emulsifier; and

15–70% by weight of water;

whereby said substrate maintains its abrasive quality in the presence of said emulsion and an abrasive cleansing action is achieved by the combination of said emulsion and the abrasive ingredient on the surface on said towel;

a plurality of said towels being provided in a selectively sealable, essentially airtight container having a hollow interior in which said plurality of towels are housed, and a means for closure associated therewith, said closure means comprising an opening therein for receiving said towels therethrough, whereby an individual said towel incorporating said emulsion can be removed from the interior of said container through said opening.

9. An abrasive metal and fiberglass cleaning article comprising:

a substrate comprising a towel presenting two opposed surfaces, and having an abrasive ingredient permanently forming a part of at least one said surface, said surface presenting a matrix capable of absorbing and retaining other components therein;

an emulsion comprising 5–40% by weight mineral spirits, 15–70% by weight water, 1–15% by weight anionic surfactant, 0.5–10% by weight emulsifying agent; 1.1–24% by weight oxidation remover agent; 5–40% by weight abrasive particulate, and 0.005–1% by weight anti-bacterial preservative agent, said emulsion being absorbed in the towel, whereby cleansing action is achieved by the combination of said emulsion and the abrasive ingredient on the surface on said towel and whereby said substrate maintains its abrasive quality in the presence of said emulsion;

a plurality of said towels being provided in a selectively sealable, essentially airtight container having a hollow interior in which said plurality of towels is housed, and a means for closure associated therewith, said closure means comprising an opening therein for receiving said towels therethrough, whereby an individual said towel incorporating said emulsion can be removed from the interior of said container through said opening.

10. A method for preparing a metal and fiberglass cleaning article, said method comprising:

providing a plurality of towels, said towels presenting two opposed surfaces, and having an abrasive ingredient permanently forming a part of at least one said surface, said towel being capable of absorbing and retaining fluid while maintaining its abrasive quality;

providing an emulsion incorporated onto said towel, said emulsion comprising:

5–40% by weight of an emulsifiable organic solvent capable of solubilizing greasy, oily soils and comprising one or more of an aliphatic liquid, a dibasic ester, vegetable oil, terpene, a glycol ether, a petroleum oil, an alcohol, a glycol, a furfuryl, a petroleum distillate, and a polyol;

1–15% by weight of a surfactant characterized by the ability to form a water and oil emulsion with said solvent;

1.1–24% by weight of an oxidation removing agent;

0.5–10% by weight of an emulsifier; and

15–70% by weight of water;

providing a selectively sealable container having a hollow interior in which said plurality of towels are housed, said container having a means for closure comprising an opening therein;

placing said plurality of towels into the interior of said container;

adding said emulsion to said plurality of towels in said container to thereby appropriately moisten said towels with a predetermined amount of said emulsion; and sealing said closure means on said container to provide an essentially airtight container.

11. A method for cleaning and polishing metal and fiberglass surfaces, comprising:

preparing a metal and fiberglass cleaning article comprising a substrate presenting two opposed sides, and having an abrasive ingredient permanently forming a part of at least one said side, said substrate presenting a matrix capable of absorbing and retaining other components therein, and an emulsion absorbed in the substrate and retained by said matrix, said emulsion comprising 5–40% by weight of an emulsifiable organic solvent capable of solubilizing greasy, oily soils and comprising one or more of an aliphatic liquid, a dibasic ester, vegetable oil, terpene, a glycol ether, a petroleum oil, an alcohol, a glycol, a furfuryl, a petroleum distillate, and a polyol, 1–15% by weight of a surfactant characterized by the ability to form a water and oil emulsion with said solvent, 1.1–24% by weight of an oxidation removing agent, 0.5–10% by weight of an emulsifier, and 15–70% by weight of water, whereby said substrate maintains its abrasive quality in the presence of said emulsion and an abrasive cleansing and polishing action is achieved by the combination of said emulsion and the abrasive ingredient on the abrasive side of said substrate;

removing oxidation and other contaminants from a surface to be cleaned by rubbing a first side of said article over said surface; and polishing the surface by rubbing a second side of said article over said surface.

12. The method as set forth in claim 11, wherein the first side of said article is abrasive.

13. The method as set forth in claim 11, wherein the second side of said article is non-abrasive.

* * * * *